(12) United States Patent
Seeboth et al.

(10) Patent No.: US 7,662,466 B2
(45) Date of Patent: Feb. 16, 2010

(54) THERMOCHROMIC POLYMER LAYER AND METHOD FOR PRODUCTION THEREOF

(75) Inventors: Arno Seeboth, Berlin (DE); Jorg Kriwanek, Berlin (DE); Detlef Lotzsch, Berlin (DE)

(73) Assignee: Fraunhofer-Gesellschaft zur Forderung der Angwandten Forschung e.V., Munich (DE)

( * ) Notice: Subject to any disclaimer, the term of this patent is extended or adjusted under 35 U.S.C. 154(b) by 112 days.

(21) Appl. No.: 10/568,210

(22) PCT Filed: Aug. 23, 2004

(86) PCT No.: PCT/EP2004/009415

§ 371 (c)(1),
(2), (4) Date: Jun. 1, 2006

(87) PCT Pub. No.: WO2005/021627

PCT Pub. Date: Mar. 10, 2005

(65) Prior Publication Data

US 2006/0246292 A1 Nov. 2, 2006

(30) Foreign Application Priority Data

Aug. 25, 2003 (DE) ................. 103 39 442

(51) Int. Cl.
*B32B 27/32* (2006.01)
*B32B 9/04* (2006.01)
*B32B 27/08* (2006.01)
*B32B 27/36* (2006.01)
*B32B 27/00* (2006.01)

(52) U.S. Cl. .................. 428/220; 428/332; 428/411.1; 428/474.4; 428/480; 428/500

(58) Field of Classification Search ........................ None
See application file for complete search history.

(56) References Cited

U.S. PATENT DOCUMENTS

| 4,028,118 A | * | 6/1977 | Nakasuji et al. .......... 106/31.19 |
| 4,121,010 A | | 10/1978 | Lasky et al. |
| 5,527,385 A | | 6/1996 | Sumii et al. |
| 6,706,218 B2 | * | 3/2004 | Lucht et al. .............. 252/408.1 |
| 2002/0037421 A1 | | 3/2002 | Arnaud et al. |
| 2002/0065401 A1 | | 5/2002 | Feiler et al. |

FOREIGN PATENT DOCUMENTS

| DE | 133004 | 11/1978 |
| DE | 35 23 661 C2 | 1/1987 |
| DE | 696 21 627 T2 | 2/2003 |
| EP | 0 524 692 A1 | 1/1993 |
| EP | 1 084 860 B1 | 3/2001 |
| EP | 1 157 802 A2 | 11/2001 |
| EP | 1 211 300 A2 | 6/2002 |
| EP | 1 323 540 A2 | 7/2003 |
| JP | 9-235545 | 9/1997 |
| KR | 2003-016589 A | 3/2003 |
| WO | WO 02/08821 A1 | 1/2002 |

OTHER PUBLICATIONS

Seeboth et al., "Thermochromic Polymers," *Encyclopaedia of Polymer Science and Technology*, 20:11 1-23 (2003).
Bamfield, "Chromic Phenomena," *The Royal Society of Chemistry*, 33-41 (2001).
English Translation of International Preliminary Report on Patentability for International Patent Application No. PCT/EP2004/009415.

* cited by examiner

*Primary Examiner*—Sheeba Ahmed
(74) *Attorney, Agent, or Firm*—Leydig, Voit & Mayer, Ltd.

(57) ABSTRACT

The invention relates to a thermochromic polymer layer and also a method for production thereof. The method is based on addition of a thermochromic colorant and if necessary further additives at the beginning of the extrusion process and subsequent extrusion to form the thermochromic polymer layer. Furthermore, the invention relates to a multilayer composite system comprising at least one thermochromic polymer layer and also at least one further layer.

22 Claims, 1 Drawing Sheet

Figure
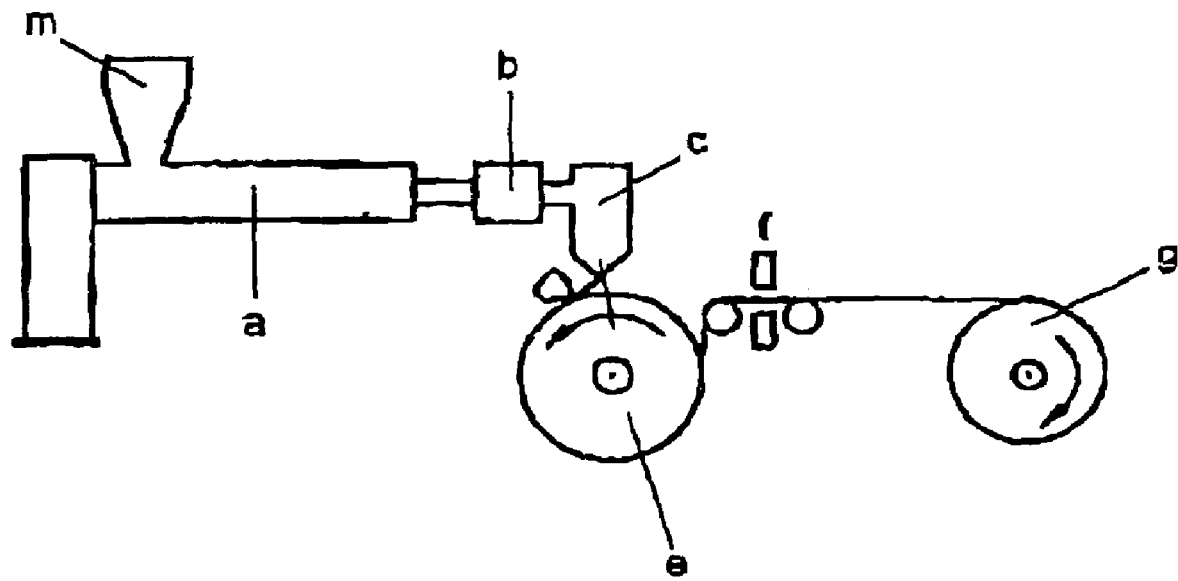

THERMOCHROMIC POLYMER LAYER AND METHOD FOR PRODUCTION THEREOF

BACKGROUND OF THE INVENTION

Thermochromism comprises the property of a material to change its colour reversibly or irreversibly as a function of the temperature. This can be effected both by changing the intensity and/or the wavelength maximum. Examples and theoretical backgrounds are described comprehensively in *Chromic Phenomena* by Peter Bamfield (The Royal Society of Chemistry, 2001) or in *Thermochromic Polymers* by A. Seeboth and D. Lötzsch (Encyclopaedia of Polymer Science and Technology, John Wiley & Sons, Inc. 2003).

The application for polymer flat films comprising polyethylene, polypropylene, polyester derivatives or a multiplicity of further polymers and combinations thereof in multilayers is nowadays omnipresent in virtually all areas of life.

It is common to polymer materials with general thermochromic properties that they generally have a thermally induced colour or transparency change. Thus the colour change with simultaneous intensity reduction is described in WO 02/08821. EP 1 084 860 claims the switching of the colour effect, based on a donator-accepter colourant system, with at least two further components. The change in colour is effected within broad temperature ranges, such as between −50° C. to 120° C. or −40° C. to 80° C. The entire colourant system can be inserted in the polymer matrix optionally also in the form of microcapsules with a diameter of approx. 50 µm.

The developments disclosed in U.S. Pat. No. 5,527,385 comprise in addition organic hydrazide, sulphur or phosphorous compounds which are intended to improve for example the lack of light stability. The thermal stability is hereby negatively influenced.

The production of polymer thermochromic materials with the help of printing (laminating) of a thermochromic colour is a practical solution for some requirements and wishes of the packaging industry but does not achieve the set objective. Thus according to US 20020037421, glasses are printed with a colour for use as sun protection or, corresponding to U.S. Pat. No. 4,121,010, polymers are coated with a thermochromic colour, comprising sulphates, sulphides, arsenic, bismuth, zinc and other metals and oxides thereof. As a result, both the field of use is greatly restricted and also as a result of the required additional coating (printing technique) cost-reducing continuous technology cannot be used. In addition, it should be mentioned that the complexity of printing or labelling is often out of all proportion to the production costs.

The cited solutions in the mentioned patent specifications are not suitable for producing large-area polymer films with thermochromic properties. This applies also to the invention described in EP 1 157 802. Here, during extrusion-blow moulding, thermochromic pigments are added only in partial regions of the wall thickness of a plastic material container. This takes place by adding a reversible thermochromic pigment in the form of strip-shaped inserts. The thermochromic pigments require in addition additional thermostable pigments and are added to or placed on the extrudate before leaving the extrusion head. Thorough mixing of thermochromic material and polymer carrier material is correspondingly not possible and is not sought here either.

Thermochromic pigments which are faded with a defined temperature effect and are commercially available are used here preferably. As is known, the pigments are added in the form of master batches in extruder technology. It has however been known for many years that master batches based on microencapsuled liquids, e.g. used in thermochromic inks, or on liquid crystal components, e.g. used in paints or films as heat sensors, do not have sufficient mechanical stability for use in extruder technology where the polymer melt is subjected to exceptional mechanical requirements at simultaneous increased temperature when passing through the extruder screw.

BRIEF SUMMARY OF THE INVENTION

The object therefore underlying the invention is to produce a completely novel polymer layer which has uniformly distributed inherent thermochromic properties over the entire layer.

This object is achieved by the method for producing single-layer thermochromic polymer layers by means of extrusion in which at least one colourant, and if necessary further additives such as melting agents and/or developers, is added to a polymer at the beginning of the extrusion process and is extruded to form the thermochromic polymer layer and also by the thermochromic polymer layer produced by the inventive method. The invention also provides a multilayer layer composite system based on a thermochromic polymer layer according to the invention, and has a layer thickness of 1 µm to 10 cm. Further advantageous developments are also disclosed.

This object is achieved according to the invention in that already at the beginning of the extrusion process, i.e. before passing through the extruder screw, a polymer material is added in addition which has thermochromic properties and simultaneously is thermostable and resistant to substantially operating mechanical shear forces in the screw process during melting of the master batch.

BRIEF DESCRIPTION OF THE DRAWING

With reference to the following FIGURE, the invention is intended to be described in greater detail.

The FIGURE shows the schematic representation of an extruder known from the state of the art. This extruder has an extruder worm (a) on which a supply funnel (m) is disposed. Mixing of the thermochromic colourant can be effected via this supply funnel. According to the state of the art, mixing has, in contrast to previously, been effected only via the feed block with nozzle (c) shortly before leaving the extruder. The extruded layers are subsequently conducted over a cooling roller (e) and finally rolled up to form a roll via the wind-up (g).

DETAILED DESCRIPTION OF THE INVENTION

The invention relates to a thermochromic polymer layer and also a method for production thereof. The method is based on extrusion with addition of a thermochromic colourant and if necessary further additives at the beginning of the extrusion process and subsequent extrusion to form the thermochromic polymer layer. Furthermore, the invention relates to a multilayer composite system comprising at least one thermochromic polymer layer and also at least one further layer.

Preferably, the colourants are based on basic structures of triphenylmethane colourants, pyridinium phenolate betaines, sulphophthalein structures, Reichardt colourants, pyranines, indicator colourants, azo pigments or fluoran colourants, such as e.g. 2-chloro-6-diethylamino-3-methylfluoran.

As polymers, preferably polyethylene, polypropylene, polyester, polyamide and/or acrylonitrile-butadiene-styrenecopolymer are used. It is however also possible to use all the polymers currently used in the extrusion process.

As melting agents, preferably octadecanol, dodecanol, hydroxycarboxylic acids and/or 1-hexadecanol are used. There are possible as developers preferably 2,2'-bis(4-hydroxyphenyl)propane, 2,2'-bis(4-hydroxyphenyl)sulphone and gallic acid dodecyl ester.

The three components are used preferably in the weight ratio of colourant:melting agent:developer=1:94:5.

This process and the suitable embodiment of the extruder worm ensure the required optimum homogeneous distribution of the thermochromic material in the polymer layer. Preferably, there is thereby no concentration gradient of the thermochromic material in the resulting layer so that the temperature-controlled colour is not a material-related, singular property of the layer. The polymer layer is inherently thermochromic. The thermochromic properties are not restricted to partial regions. This applies explicitly also to this property with respect to the cross-section.

The choice of polymer materials which are used is only limited technologically. All polymers used at present in the extrusion process can be used. The thermochromic pigment based on a polymer material can also be used without further polymer additives, such as for example polyethylene, polypropylene or polyester, i.e. as individual components for producing a thermochromic film. As melting agents and developers for the thermochromic effects in cooperation with the pigments, all materials can be used according to the invention which fulfil this function and which are destroyed neither thermally, mechanically nor chemically during extrusion. Combinations of pigments, melting agents and developers are possible.

The choice of polymer and its molecular mass influence the resulting thermochromic properties of the layer just as the molecular structure of the organic or inorganic pigment and the possibly used developers and melting agents. The specific structure/property relationship of the pigments, melting agents, developers and polymer which were used decisively determined the temperature region of the colour transitions.

According to the invention, the polymer layer can have a layer thickness in the range of 1 μm to 10 cm. Preferably, the polymer layer has a thickness of 1 μm to 1 mm. Preferably, the polymer layer is thereby formed as a polymer film.

It is evident to the person skilled in the art that, on the one hand, the technological parameters, such as the respective temperature in the worm housing, in the nozzle, on the surface of the chill-roll and also the flow speed in the extruder and the withdrawal speeds of the chill-roll and winding roll but also, on the other hand, the specific material properties of the polymer and of the thermochromic pigments must be coordinated to each other optimally.

The thermochromic monolayer with any arbitrary layer thickness can be combined with a further layer or even a plurality of layers for modification with additional properties. Multilayers of the general arrangement, such as for example ABA or ABCBA, can be produced. The individual layers can hereby have the conventional function of a protective or barrier layer. They can however also have thermochromic or non-thermochromic pigments of an organic or inorganic type in order to produce further temperature-controlled colour effects. Corresponding to the additive or subtractive colour formation, the most varied of colour switches can be achieved within previously determined temperature ranges. The colour switches can be effected over a wide temperature range of ΔT 1-25° C. Preferably, the switch effect is effected in narrowly maintained temperature ranges of ΔT 1-2° C. Switches are also possible in the operating range of above 80° C., which is made possible in particular by suitable choice of melting agent or combination thereof. The temperature-induced change in intensity and in wavelength maximum can be complemented by additional translucence effects.

According to the invention, a multilayer layer composite system is likewise provided which contains at least one thermochromic polymer layer, as is described above, and at least one further layer. There are possible as further layer all the layers known in the state of the art which are suitable for extrusion.

With reference to the following examples, the invention is intended to be described in greater detail.

Example 1

According to the invention, a thermochromic polymer film can be produced according to the following flat-film extrusion processes. The extrusion funnel is supplied with a mixture of polyethylene (PE-LD) and a blue thermochromic pigment which is thermally and mechanically stable. The mixture ratio in % by weight is 94:6. The heating zones of the extruder are as follows: zone 1 at 175° C., zone 2 at 186° C. and zones 3, 4 and 5 at respectively 194° C. The temperatures at the feed block and at the nozzle 1, 2 and 3 are 228° C. The speed of rotation of the worm is 68 rpm. After several minutes dwell time in the extruder, the polymer is taken up by the chill-roll at a speed of 6.3 m/min and a temperature of 52° C. During winding up, the speed of the layer is kept constant. As a result, a thermochromic layer which is blue at room temperature is obtained, with a layer thickness of 39 μm which switches reversibly in the temperature range of 38° C.-40° C. from blue to colourless. The layer is inherently thermochromic in its entirety.

Example 2

According to the invention, a multilayer with thermochromic properties can be produced according to the following flat-film extrusion process. The extrusion funnel of the extruder C is supplied with a mixture of polyethylene (PE-LD) and a red thermochromic pigment which is thermally and mechanically stable. The mixture ratio in % by weight is 86:14. The extruder A for the protective layer is likewise supplied with PE-LD. Extruder B, responsible for the separating layer, is filled with polypropylene. The heating zones of the extruder C are 180° C., 190° C., 195° C., 195° C. and 195° C. for zones 1 to 5. At the feed block and at the nozzle the temperatures are 236° C. The speed of rotation of the worm is set at 58 rpm. At the extruder B, the temperatures for zones 1 to 4 are fixed at 200° C., 210° C., 220° C. and 220° C. The worm runs at 34 rpm. For extruder A, the temperature for the first heating zone is 182° C. and for zones 2 to 5 is respectively 190° C. and the worm runs at 68 rpm. The chill-roll operates at 6.0 m/min at 55° C. As a result, a thermochromic ABCBA film which is red at room temperature is obtained, with a layer thickness of 135 μm. The thermochromic layer is hereby 45 μm thick. The two separating layers are respectively 20 μm and the two outer protective layers 25 μm thick. The polymer film switches reversibly in the temperature range of 83° C.-85° C. from red to colourless.

The technological parameters cited in the Examples, such as the temperatures in the heating zones, the chill-roll, the speed of rotation in rpm of the worms, the withdrawal speed of the chill-roll in m/min and the winding speed can be varied and combined in many different ways, as can be detected immediately by the person skilled in the art.

Example 3

According to the invention, a monolayer with thermochromic properties can be effected analogously to Example 1. A 50 mm slot die is hereby used and the chill-roll is not in operation. The speed of rotation of the worm is 93 rpm. As a result, a layer with a thickness of 0.28 cm is obtained.

The invention claimed is:

1. A thermochromic polymer layer which can be produced by a method consisting of extruding a thermochromic polymer with at least one colourant selected from the group consisting of pyridinium phenolate betaines, sulphophthalein structures, Reichardt colourants, triphenylmethane colourants, pyranines, flouran colourants, and azo pigments, and with a further additive or additives selected from the group consisting of a melting agent and a developer added to the polymer at the beginning of the extrusion process, to form the thermochromic polymer layer, wherein no concentration gradient of the thermochromic material is present in the resulting layer.

2. The polymer layer according to claim 1, wherein a reversible colour switching is effected in a wide temperature range of $\Delta T$ from 1 to 25° C.

3. The polymer layer according to claim 1, wherein a reversible colour switching is effected in a narrow temperature range of $\Delta T$ from 1 to 2° C.

4. The polymer layer according to claim 1, wherein the colour switching is accompanied by a changed translucence behaviour.

5. The polymer layer according to claim 1, wherein the layer has a layer thickness of 1 µm to 10 cm.

6. The polymer layer according to claim 5, wherein the layer thickness is from 1 µm to 1 mm.

7. The polymer layer according to claim 5, wherein the polymer layer is a polymer film.

8. The polymer layer according to claim 1, wherein the melting agent is selected from the group consisting of octadecanol, dodecanol, hydroxylic acids and 1-hexadecanol and combinations thereof.

9. The polymer layer according to claim 1, wherein the developer is selected from the group consisting of 2,2'-bis(4-hydroxyphenyl)propane, 2,2'-bis(4-hydroxyphenyl)sulphone and gallic acid dodecyl ester and combinations thereof.

10. The polymer layer according to claim 1, wherein the colourant is added to the polymer in a supply funnel of the extrusion process.

11. The polymer layer according to claim 1, wherein the colourant, the polymer and the further additive or additives are provided in the form of a master batch.

12. The polymer layer according to claim 1, wherein the polymer is selected from the group consisting of polyethylene, polypropylene, polyester, polyamide, and acrylonitrile-butadiene-styrene-copolymer and combinations thereof.

13. A multilayer layer composite system containing at least one thermochromic polymer layer according to claim 1 and at least one further film.

14. The multilayer composite system according to claim 13, wherein the melting agent present in the at least one thermochromic polymer layer is selected from the group consisting of octadecanol, dodecanol, hydroxylic acids and 1-hexadecanol and combinations thereof.

15. The multilayer composite system according to claim 13, wherein the developer present in the at least one thermochromic polymer layer is selected from the group consisting of 2,2'-bis(4-hydroxyphenyl)propane, 2,2'-bis(4-hydroxyphenyl)sulphone and gallic acid dodecyl ester and combinations thereof.

16. The multilayer composite system according to claim 13, wherein the colourant is added to the polymer of the at least one thermochromic polymer layer in a supply funnel of the extrusion process to prepare the at least one thermochromic polymer layer.

17. The multilayer composite system according to claim 13, wherein the colourant, the polymer and the further additive or additives are provided in the form of a master batch during the preparation of the at least one thermochromic polymer layer.

18. The multilayer composite system according to claim 13, wherein a reversible colour switching is effected in the at least one thermochromic polymer layer in a wide temperature range of $\Delta T$ from 1 to 25° C.

19. The multilayer composite system according to claim 13, wherein a reversible colour switching is effected in the at least one thermochromic polymer layer in a narrow temperature range of $\Delta T$ from 1 to 2° C.

20. The multilayer composite system according to claim 13, wherein the colour switching in the at least one thermochromic polymer layer is accompanied by a changed translucence behaviour.

21. The multilayer composite system according to claim 13, wherein the at least one thermochromic polymer layer has a thickness of 1 µm to 10 cm.

22. The multilayer composite system according to claim 13, wherein the at least one thermochromic polymer layer has a thickness of 1 µm to 1 mm.

* * * * *